United States Patent Office 2,885,661
Patented May 5, 1959

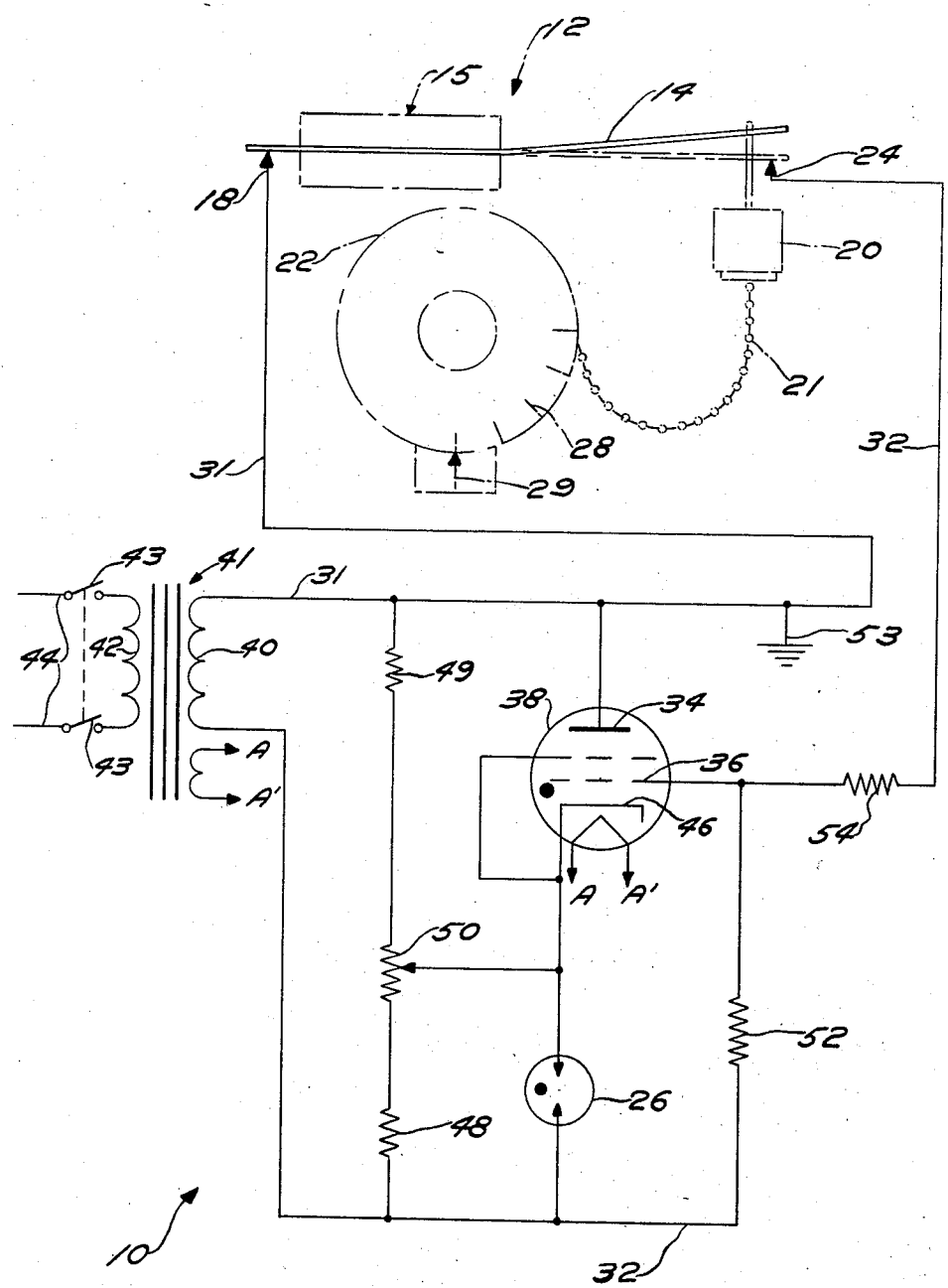

2,885,661

HIGH RESISTANCE CONTINUITY INDICATOR

Martin J. Brown, Chicago, and Charles C. Cole, Western Springs, Ill., assignors to Western Electric Company, Incorporated, New York, N.Y., a corporation of New York Application September 20, 1955, Serial No. 535,394

1 Claim. (Cl. 340—282)

This invention relates to a high resistance continuity indicator, and more particularly to a device for use with testing apparatus to indicate the completion of a normally open high resistance circuit in response to movement of a member being tested to a predetermined position.

An object of the invention is to provide an improved high resistance continuity indicator.

Another object of the invention is to provide an indicating device for use with testing apparatus to indicate the completion of a normally open high resistance circuit in response to movement to a predetermined position of a member being tested in said apparatus.

An indicating device illustrating certain features of the invention, as used, for example, with an apparatus for testing the tension of pre-tensioned leaf springs, may include a pair of test terminals mounted on the testing apparatus and adapted to be contacted and bridged by the leaf spring to complete an electrical circuit when the spring is flexed to a predetermined position. A pair of leads electrically connect these test terminals to a plate and a control grid of a gas-filled electronic tube and to a source of alternating current. The cathode of the tube is connected in series with a glow lamp to one of said leads, and a cathode biasing voltage divider network across the leads is adjusted to bias the cathode to a predetermined value intermediate that of the grid and the plate so that the grid is negatively biased to render the tube normally non-conductive. When a spring being tested is flexed into engagement with and bridges the test terminals the negative bias on the control grid is reduced, the tube is rendered conductive, and current flows through the lamp to indicate to the operator that contact has been made between the spring and the contacts.

Other objects and advantages of the invention will be more fully described in the following detailed description thereof and the single figure illustrating the invention.

The high resistance continuity indicating device 10 selected to illustrate one embodiment of the invention is shown in connection with an apparatus 12 for measuring the tension of pre-tensioned leaf springs 14. One end of a leaf spring is clamped in a holder 15 of the apparatus in engagement with a test terminal 18 of the indicating device 10, and from the other end of the leaf spring is suspended a weight 20 which has a beaded chain 21 attached thereto. Portions of the chain 21, which are wound on a drum 22, may be unwound by turning the drum to add additional weight to the spring until the weight is sufficient to move the free end of the spring to a predetermined position in engagement with a fixed test terminal 24 of the indicating device 10 to complete a circuit for effecting the actuation of a signal 26 in the form of a glow lamp. The tension of the leaf spring 14 is indicated on a scale 28 on the drum by a stationary reference line 29.

Because of the presence of a film of oxide and/or a film of oil on the surface of the leaf springs, the contact between the springs and the test electrode has a high resistance value. The indicating device may be designed to indicate continuity through resistances of order of magnitude of megohms or less.

The test terminals 18 and 24 are connected by leads 31 and 32, respectively, to a plate 34 and a control grid 36, respectively, of a gas-filled electronic tube 38. The leads 31 and 32 also connect the test terminals 18 and 24 to the secondary 40 of a transformer 41, the primary 42 of which is connected through a switch 43 to power lines 44. The tube 38 has a cathode 46 which is connected in series with the glow lamp 26 to the lead 32. Resistors 48 and 49 and potentiometer 50 form a voltage divider for biasing the cathode to a selected value intermediate that of the control grid and the plate so that the negative bias of the control grid renders the tube normally non-conducting. A grid resistor 52 is connected in the lead 32. The negative bias of the control grid is adjusted by turning the potentiometer 50 so that the signal lamp 26 does not light when the test terminals 18 and 24 are open but does light when a high resistance, greater than the contact resistance between the leaf spring 14 and the test terminal 24, is connected across the terminals. When the leaf spring 14 is flexed into engagement with and bridges the test terminals 18 and 24, a circuit is closed therethrough, causing current to flow through the grid load resistor 52 which changes the grid bias and causes the tube to conduct. Current then flows through and lights the lamp 26.

The full voltage of the power source 41 is applied to the test terminals 18 and 24 to overcome the high contact resistance between the spring 14 and the test terminal 24. In order to protect the operator from electric shock the lead 31 is grounded, as indicated at 53, to the frame of the tension measuring apparatus 12, and a resistor 54 is inserted in the lead 32, which resistor 54 together with the resistor 52 limits to a safe value the current that can be drawn by an operator touching the test terminals.

In the operation of the device the switch 43 is closed to energize the indicating device 10, a leaf spring 14 is clamped in the holder 15 of the tension measuring apparatus 12 in contact with the test terminal 18, the weight 20 is suspended from the free end of the leaf spring, and the drum 22 is turned to unwind the chain 21 and add sufficient additional weight to the spring to move it into a predetermined position in contact with the fixed test terminal 24. When the free end of the leaf spring 14 contacts the test terminal 24, the test terminals 18 and 24 are bridged by the spring which causes the bias on the control grid 36 to be changed, causing the tube to conduct and current to flow through and operate the signal lamp 26. The operator, upon seeing the lighted signal lamp 26, stops turning the drum 22 and can determine from the scale 28 and the pointer 29 whether the tension of the leaf spring 14 being tested is within an acceptable range.

When a leaf spring 14 is bridging the test terminals 18 and 24, and the tube 38 of the indicating device 10 is conducting, the alternating power supply voltage serves to automatically reset the tube 38 to a non-conducting state during each cycle of the current so that when a leaf spring has been tested and removed from the apparatus 12, the tube 38 is in a non-conducting state and the indicating device 10 is in condition to be used with the apparatus 12 for testing another spring.

While the indicating device 10 is disclosed as having a source of alternating current to supply power thereto, it will be understood that a source of direct current may be used and that means may be provided, such as a switch, for breaking the plate circuit to return the tube to a non-conducting state after a leaf spring has been tested.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

In a device for stressing and measuring the stress on an electro-conductive test member, means for holding the test member with one portion thereof clamped in a fixed position and with another portion thereof supported for movement to a predetermined test position, means for stressing the other portion of the test member and progressively increasing the magnitude of the stress to move said other portion to said test position, means for indicating the magnitude of the stress applied to the test member, and means for indicating the instant when the other portion of the test member is moved to said test position which comprises a pair of terminals fixedly mounted on said holding means with one terminal engageable with said one portion of the test member and the other terminal engageable with said other portion of the test member when said other portion has been stressed to said test position, a source of alternating current connected to said terminals, a gas filled electronic tube having a cathode and an anode connected to said source of current and having a control grid, an indicating device connected in the cathode circuit of the electronic tube and operable when the electronic tube is conductive, a voltage divider connected to said source of current for biasing said electronic tube toward nonconduction, and a second voltage divider connected to said grid and in series with one of the terminals for changing the bias of said tube to render it conductive in response to completion of a circuit through the terminals when the other portion of the test member is moved into engagement with said other terminal.

References Cited in the file of this patent

UNITED STATES PATENTS

| | | |
|---|---|---|
| 2,280,119 | Gorman et al. | Apr. 21, 1942 |
| 2,304,513 | Stearns | Dec. 8, 1942 |
| 2,431,429 | Sepavich et al. | Nov. 25, 1947 |
| 2,436,615 | Stearns | Feb. 24, 1948 |
| 2,594,595 | Stearns | Apr. 29, 1952 |